(12) United States Patent
Takagi

(10) Patent No.: US 8,467,310 B2
(45) Date of Patent: Jun. 18, 2013

(54) BASE TRANSCEIVER STATION AND METHOD OF DETERMINING TRANSMIT POWER

(75) Inventor: Kenki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 258 days.

(21) Appl. No.: 12/863,742

(22) PCT Filed: Feb. 24, 2009

(86) PCT No.: PCT/JP2009/000807
§ 371 (c)(1),
(2), (4) Date: Jul. 20, 2010

(87) PCT Pub. No.: WO2009/110188
PCT Pub. Date: Sep. 11, 2009

(65) Prior Publication Data
US 2011/0007649 A1    Jan. 13, 2011

(30) Foreign Application Priority Data

Mar. 3, 2008    (JP) ................................. 2008-052469

(51) Int. Cl.
*H04J 1/16*    (2006.01)
(52) U.S. Cl.
USPC ........................................ 370/252; 455/522
(58) Field of Classification Search
USPC .................... 370/252, 329; 455/522
See application file for complete search history.

(56) References Cited

U.S. PATENT DOCUMENTS

| 8,320,307 | B2 | 11/2012 | Niwano | |
|---|---|---|---|---|
| 2004/0203450 | A1* | 10/2004 | Cho | 455/67.11 |
| 2005/0238053 | A1* | 10/2005 | Iochi et al. | 370/473 |
| 2007/0259668 | A1* | 11/2007 | Legg | 455/450 |
| 2008/0159184 | A1* | 7/2008 | Niwano | 370/278 |
| 2008/0305824 | A1* | 12/2008 | Haim et al. | 455/522 |
| 2009/0154403 | A1* | 6/2009 | Niwano | 370/329 |
| 2010/0216473 | A1* | 8/2010 | Kazmi et al. | 455/436 |
| 2010/0322199 | A1* | 12/2010 | Andersson | 370/335 |

FOREIGN PATENT DOCUMENTS

| CN | 1836460 A | 9/2006 |
|---|---|---|
| CN | 101112018 A | 1/2008 |
| JP | 2000332751 A | 11/2000 |
| JP | 2001292096 A | 10/2001 |
| JP | 2004193676 A | 7/2004 |
| JP | 2007013351 A | 1/2007 |
| JP | 2007514367 A | 5/2007 |
| JP | 2007532022 A | 11/2007 |
| WO | 2006023485 A | 3/2006 |

OTHER PUBLICATIONS

International Search Report for PCT/JP2009/000807 mailed Mar. 31, 2009.
Japanese Office Action for JP2010-501782 issued Apr. 24, 2012.
Chinese Office Action for CN200980106232.2 dated Nov. 5, 2012.

* cited by examiner

*Primary Examiner* — Andrew Lee

(57) ABSTRACT

A base transceiver station (200) that transmits same data to a plurality of mobile stations (300) using a common channel includes a maximum transmit power detector (41) that detects a maximum transmit power value at each spreading factor during transmission of the data from a transmit power of the data transmitted to the plurality of mobile stations (300) in cells controlled by the base transceiver station (200), and a transmit power determination unit (42) that determines a transmit power at each spreading factor based on the relation between the maximum transmit power values detected and the spreading factors.

8 Claims, 3 Drawing Sheets

FIG. 4

| SPREADING FACTOR | MAXIMUM TRANSMIT POWER IN CELL |
|---|---|
| 256 | 23dBm |
| 128 | 26dBm |
| 64 | 28dBm |
| 32 | 32dBm |
| 16 | 35dBm |
| 8 | 37dBm |

FIG. 5

| SPREADING FACTOR / TRANSMIT POWER | 256 23dBm | 128 26dBm | 64 28dBm | 32 32dBm | 16 35dBm | 8 37dBm |
|---|---|---|---|---|---|---|
| 256 23dBm | | TWICE | FOUR TIMES | EIGHT TIMES | 16 TIMES | 32 TIMES |
| 128 26dBm | 0.5 TIME | | TWICE | FOUR TIMES | EIGHT TIMES | 16 TIMES |
| 64 28dBm | 0.25 TIME | 0.5 TIME | | TWICE | FOUR TIMES | EIGHT TIMES |
| 32 32dBm | 0.12 TIME | 0.25 TIME | 0.5 TIME | | TWICE | FOUR TIMES |
| 16 35dBm | 0.06 TIME | 0.12 TIME | 0.25 TIME | 0.5 TIME | | TWICE |
| 8 37dBm | 0.03 TIME | 0.06 TIME | 0.12 TIME | 0.25 TIME | 0.5 TIME | |

BASE TRANSCEIVER STATION AND METHOD OF DETERMINING TRANSMIT POWER

TECHNICAL FIELD

The present invention relates to a base transceiver station and a method of determining transmit power.

BACKGROUND ART

A technique called a Multimedia Broadcast and Multicast Service (hereinafter, MBMS) has recently been standardized for distributing multimedia contents such as motion pictures and music, under the Wideband-Code Division Multiple Access (W-CDMA) system.

The MBMS has enabled broadcasting service of the contents utilizing the Forward Access Channel (hereinafter, FACH), which has conventionally been serving as the common channel, to thereby save the radio resource in response to the increase in demand for the multimedia service.

The FACH refers to the downlink common channel transmitted by the base transceiver station, which is utilized for transmitting control information and user data.

An example of a system related to the MBMS is a system configured with the base transceiver station and a base transceiver station controller. In such a system, when a plurality of cells exists under control of the base transceiver station, the base transceiver station allocates each of the cells with the FACH for distributing the contents and transmits the same contents to the respective FACH.

Multimedia service provided by the MBMS (hereinafter, MBMS service) is different from multimedia service using an existing common channel in that high data rate is required.

For example, in the MBMS service, data rate service of about 128 kpbs or 256 kpbs has to be provided in the entire area covered by each cell using the common channel.

Consequently, to provide high-data-rate service as the MBMS service so as to cover the entire cells, the base transceiver station needs a very large amount of transmit power.

There is a possibility that, by providing the MBMS service, the base transceiver station consumes power which can be used in other speech calls and packet access calls.

A technique for controlling the transmit power for a multicast signal in a base station is described in Patent Document 1.

[Patent document 1] Japanese Laid-open patent publication NO. 2001-292096

DISCLOSURE OF THE INVENTION

Patent Document 1 describes that, when a mobile station obtains reception quality information of a multicast signal, the mobile station transmits the reception quality information to a base station, retrieves the lowest reception quality information from reception quality information received by the base station and, based on the lowest reception quality information, determines a transmit power.

The technique disclosed in the foregoing documents, however, still has a room for improvement in the following aspects.

First, by the mobile station's obtaining reception quality information and transmitting it to a base station, the base station receives reception quality information of a plurality of mobile stations and grasps reception states of the mobile stations.

There is consequently an issue that in the case where a mobile station existing at a cell end cannot transmit reception quality information indicative of the reception state at the cell end to the base station, the base station cannot control a transmit power in consideration of the mobile station at the cell end.

Second, in the case where the mobile station at the cell end cannot transmit reception quality information, the base station cannot grasp that a mobile station exists at the cell end.

There is consequently an issue that the base station has to increase a transmit power value so as to cover all of cells under control on precondition that mobile stations exist at all of cell ends.

The present invention has been accomplished in view of the foregoing situation, with an object to provide a base transceiver station enabling MBMS service with minimum power necessary to assure required quality.

According to the present invention, there is provided a base transceiver station that transmits same data to a plurality of mobile stations using a common channel, comprising:

a maximum transmit power detector that detects a maximum transmit power value at each spreading factor during transmission of the data, from a transmit power of the data transmitted to the plurality of mobile stations in cells controlled by the base transceiver station; and a transmit power determination unit that determines a transmit power at each spreading factor based on the relation between the maximum transmit power values detected and the spreading factors.

According to the present invention, there is provided a method of determining transmit power in a base transceiver station that transmits same data to a plurality of mobile stations using a common channel, comprising:

detecting a maximum transmit power value at each spreading factor during transmission of the data, from a transmit power of the data transmitted to the plurality of mobile stations in cells controlled by the base transceiver station; and determining a transmit power at each spreading factor based on the relation between the maximum transmit power values detected and the spreading factors.

According to the present invention, a base transceiver station enabling the MBMS service with the minimum power necessary to assure required quality is provided.

BRIEF DESCRIPTION OF THE DRAWINGS

The foregoing and other objects, features and advantages will become more apparent through preferred embodiments described below and the accompanying drawings.

FIG. 4 shows an example displaying power values as maximum transmit power for spreading factors extracted by the transmit power control circuit according to the embodiment.

FIG. 5 shows an example displaying, in a matrix, the relation between the spreading factor and the maximum transmit power in the embodiment.

BEST MODE FOR CARRYING OUT THE INVENTION

Figure 1:
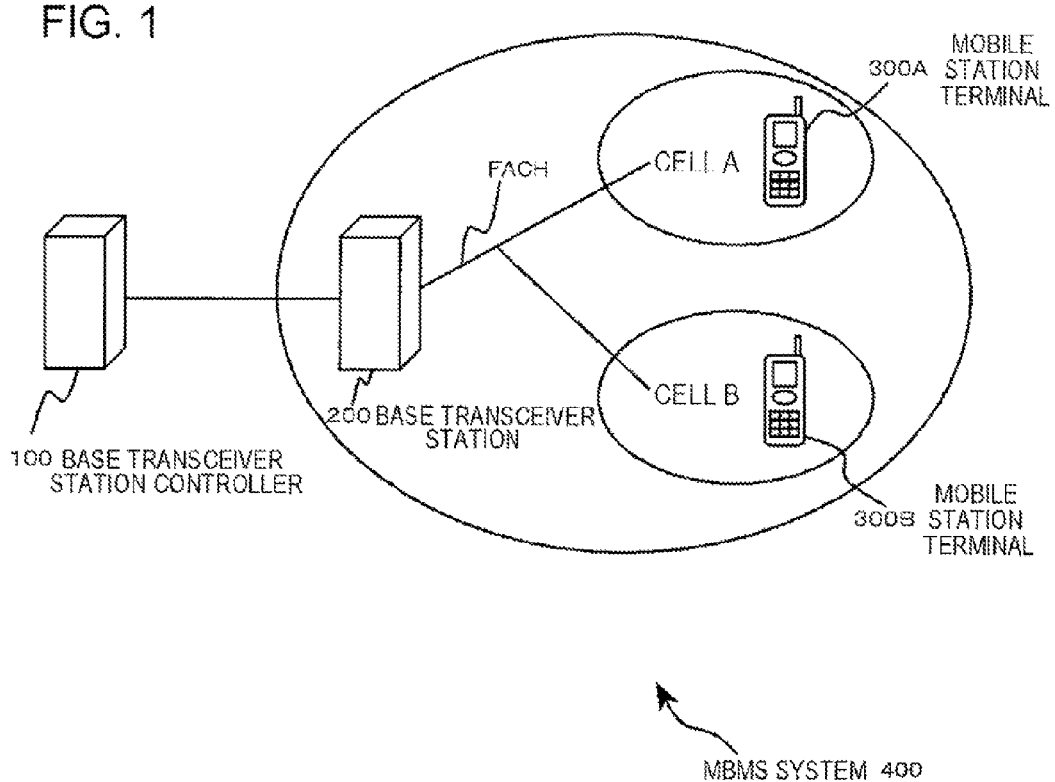
FIG. 1 shows a general configuration of an MBMS system according to an embodiment of the invention.

Hereunder, an embodiment of the present invention will be described referring to the drawings. In all the drawings, the same constituents will be given the same numeral, and the description thereof will not be repeated.

First, an MBMS system 400 according to the embodiment of the present invention is shown in FIG. 1.

FIG. 1 shows an overall configuration of the MBMS system 400 according to this embodiment.

The MBMS system 400 shown in FIG. 1 includes a base transceiver station controller 100, a base transceiver station 200, a mobile station terminal 300A located in a cell A, and a mobile station terminal 300B located in a cell B.

The base transceiver station controller 100 transmits, to the base transceiver station 200, a control signal for controlling transmit power to be transmitted to each of the cells by the base transceiver station 200. The base transceiver station controller 100 also has a function of controlling a wireless circuit network such as handover, a function of a voice coding apparatus for processing telephone voice, and the like.

The transmit power denotes power of transmitting data by using a common channel at each spreading factor by the base transceiver station 200 to a mobile station terminal 300 in the cell. The base transceiver station 200 monitors the quality of communication with the mobile station terminal 300 and performs a control of increasing the transmit power when the quality is bad and decreasing the transmit power when the quality is excessive.

The base transceiver station 200 receives a control signal transmitted from the base transceiver station controller 100 and, based on the control signal, transmits multimedia content data such as motion pictures and music by using the common channel to the plurality of mobile station terminals 300.

The mobile station terminal 300 is a portable terminal that receives multimedia content data such as motion pictures and music transmitted from the base transceiver station 200 by using a common channel.

Hereinafter, in the case where it is not necessary to specify a particular one of the mobile station terminals 300A and 300B, the terminal will be simply referred to as the mobile station terminal 300.

Figures 2, 3:
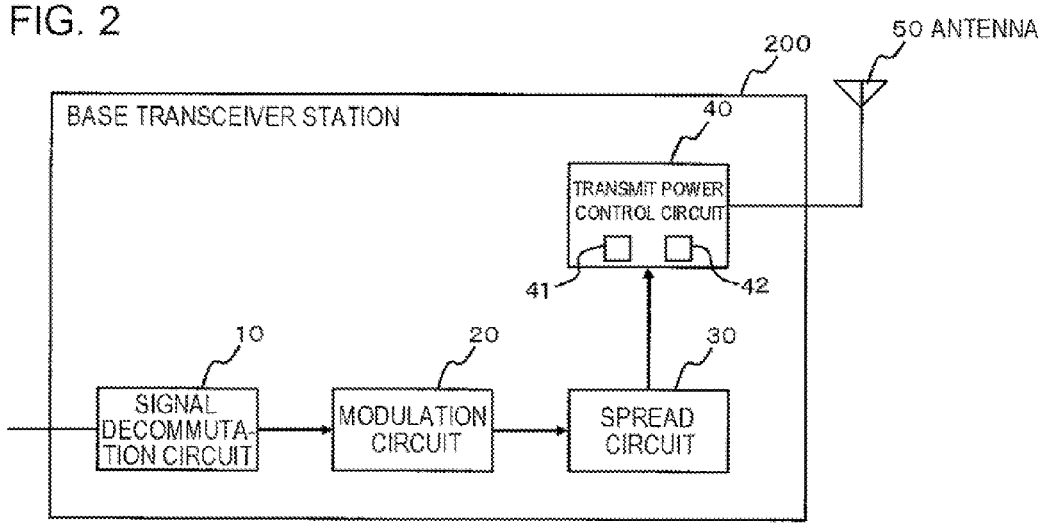
FIG. 2 is a block diagram of a base transceiver station according to the embodiment.
FIG. 3 shows an example of a list of transmit power and spreading factors for each of mobile station terminals in cells, transmitted by a transmit power control circuit according to the embodiment.

The base transceiver station 200 according to this embodiment is shown in FIG. 2.

FIG. 2 is a block diagram representing the base transceiver station 200 according to this embodiment.

The base transceiver station 200 shown in FIG. 2 is a base transceiver station that, transmits data of multimedia content to a plurality of mobile station terminals 300 (mobile stations) using the common channel, and includes a signal decommutation circuit 10, a modulation circuit 20, a spread circuit 30, a transmit power control circuit 40, and an antenna 50.

The constituents of the base transceiver station 200 operate as follows.

The signal decommutation circuit 10 decommutates the signal transmitted from the base transceiver station controller 100, which is a multiplex signal of sound data and so on, into each single communication channel carrying data code such as the sound.

The modulation circuit 20 modulates the data code of each communication channel, so that radio wave can carry the data.

In this embodiment, for example, a Binary Phase Shift Keying (hereinafter, BPSK) mode may be adopted for the uplink transmission, and a Quadrature Phase Shift Keying (hereinafter, QPSK) mode for the downlink transmission. Here, since the BPSK and QPSK are both popularly adopted modes, the description thereof will not be provided.

The spread circuit 30 executes spread modulation with a spread code on the signal modulated by the modulation circuit 20, thereby spreading the spectrum.

The transmit power control circuit 40 amplifies the transmit power of the signal, which has undergone the spectrum-spreading by the spread circuit 30 and transmits the amplified signal to the mobile station terminal 300 via the antenna 50.

The transmit power control circuit 40 includes a maximum transmit power detector 41 and a transmit power determination unit 42.

The maximum transmit power detector 41 detects the maximum transmit power value at each spreading factor during transmission of multimedia content data from transmit power of multimedia content data transmitted to the plurality of mobile stations 300 in the cells controlled by the base transceiver station 200.

The transmit power determination unit 42 determines the transmit power at each spreading factor based on the relation between the detected maximum transmit power value and the spreading factor.

Therefore, the transmit power control circuit 40 has the function of the maximum transmit power detector 41 and the function of the transmit power determination unit 42.

The antenna 50 transmits the spread-spectrum signal, the transmit power of which has been amplified by the transmit power control circuit 40, to the mobile station terminals 300.

It is to be noted that this embodiment is intended to describe that the base transceiver station 200 can control and determine the transmit power by itself. The function of the base transceiver station 200, of demodulating the signal transmitted from the mobile station terminal 300 is a widely known technique, and hence the description thereof will not be provided.

Next, in the embodiment, the operation performed when the base transceiver station 200 transmits the multimedia content data toward the mobile station terminals 300 by using the common channel will be described.

First, the base transceiver station controller 100 transmits, to the base transceiver station 200, a control signal for controlling the transmit power that transmits multimedia content data on a cell unit basis by the base transceiver station 200.

On receipt of the control signal, the base transceiver station 200 handles the signal as a default signal for controlling the transmit power and transmits multimedia content data by using the common channel with the default transmit power.

At that time, the base transceiver station 200 measures the spreading factor at which the multimedia content data is transmitted to all of the mobile station terminals 300 in the cells by the transmit power control circuit 40 and the transmit power at the spreading factor.

The spreading factor denotes a ratio of spreading code rate to transmission data rate. Generally, in wireless communication, a communication system called spread spectrum (SS) system is employed. The spread spectrum system is a system of multiplying transmission data with a code series called a spreading code whose rate is higher than the transmission data rate, thereby spreading a frequency bandwidth and transmitting the signal with the wider bandwidth.

The transmit power control circuit 40 makes a list of the measured transmit power and the spreading factor for each of the mobile station terminals 300.

FIG. 3 shows an example of the spreading factor and the transmit power measured by the transmit power control circuit 40.

FIG. 3 is a list of the transmit power transmitted by the transmit power control circuit 40 in the base transceiver station 200 to the mobile station terminals 300 in the cells and the spreading factor.

The transmit power control circuit 40 rearranges the transmit power and the spreading factors in the list for each of the mobile station terminals 300 in FIG. 3, extracts the transmit power at each spreading factor, and extracts the maximum transmit power from the spreading factors (hereinafter, the maximum transmit power).

FIG. 4 shows an example of extracting the maximum transmit power by the transmit power control circuit 40.

FIG. 4 shows the power value when the transmit power control circuit 40 extracts the maximum transmit power at each spreading factor.

Although the case of sampling once when the transmit power control circuit 40 transmits multimedia content data from the base transceiver station 200 has been described in the embodiment, the embodiment is not limited to the case. An average value of transmit powers maybe obtained by sampling more than once and extracting the transmit power and the maximum transmit power may also be extracted from the average values of the transmit power.

In this case, the maximum transmit power detector 41 can detect the maximum transmit power value at predetermined intervals, calculate the average value of the maximum transmit power values, and detect the maximum transmit power value by using the average value of the maximum transmit power values calculated at each spreading factor.

In the embodiment, the transmit power control circuit 40 calculates the transmit power using, as the reference to determine the transmit power, the spreading factor at which the maximum transmit power is used from the relation between the spreading factor and the maximum transmit power shown in FIG. 4.

Thus, from the detected maximum transmit power value, the transmit power determination unit 42 determines the transmit power at each spreading factor by the maximum transmit power whose rate to spreading factor is the highest.

For example, in the case of FIG. 4, it corresponds to the case where the spreading factors are 256, 128, 32, and 16. When the spreading factor is 256, the value when the maximum transmit power is 23 dBm is used as a reference. When the spreading factor is 128, the value when the maximum transmit power is 26 dBm is used as a reference. When the spreading factor is 32, the value when the maximum transmit power is 32 dBm is used as a reference. When the spreading factor is 16, the value when the maximum transmit power is 35 dBm is used as a reference.

In the embodiment, it is assumed that when the spreading factor increases to double, the maximum transmit power increases by 3 dBm and, when the spreading factor decreases to the half, the maximum transmit power decreases by 3 dBm.

The transmit power control circuit 40 determines the transmit power of the MBMS service based on the spreading factor at which the base transceiver station 200 transmits data from the relation between the spreading factor as the reference calculated from FIG. 4 and the maximum transmit power.

For example, when the spreading factor is 64, the maximum transmit power may be determined as 29 dBm. When the spreading factor is 8, the maximum transmit power may be determined as 38 dBm.

FIG. 5 is a reference diagram showing the relation between the spreading factor and the maximum transmit power.

FIG. 5 shows the relation between the spreading factor and the maximum transmit power illustrated in FIG. 4 in a matrix.

In the relation between the spreading factor and the transmit power shown in FIG. 5, the spreading factor and transmit power are shown in each of the vertical and horizontal axes, and the ratios corresponding to the spreading factors are shown.

As described above, the transmit power control circuit 40 calculates the ratio from the relation between the spreading factor and the transmit power shown in FIG. 5, and can determine the maximum transmit power corresponding to each of the spreading factors.

As described above, according to the embodiment, by calculating the ratio of the transmit power to each of the spreading factors using the spreading factor and the maximum transmit power of the mobile station terminal 300 existing in a cell controlled by the base transceiver station 200, the minimum transmit power assuring predetermined quality in the MBMS service can be determined.

Therefore, since the base transceiver station 200 in the embodiment can properly control a transmit power at which multimedia content data is transmitted via a common channel to the mobile station terminal 300 in the cell controlled, the transmit power as limited resource can be effectively used.

Although the embodiments of the invention have been described above with reference to the drawings, they are exemplifications of the present invention, and various configurations other than the above can also be employed.

For example, in the case of setting required quality of the MBMS service to be higher than that of the other service, a predetermined offset may be added to the maximum transmit power described above, and the transmit power to which the offset is added maybe used as the transmit power of the MBMS service provided by the embodiments.

Thus, the transmit power determination unit 42 can determine the transmit power by adding an offset to a corresponding maximum transmit power value for a spreading factor.

In this case, it is assumed that an offset of 3 dB is added to increase the required quality of the MBMS service by 50%, when the spreading factor of the MBMS service is 128, 26+3=29 dBm. When the spreading factor is 64, 29+3=32 dBm.

In such a manner, by providing an offset to increase the quality by 50% in the MBMS service in the embodiment, the quality necessary for the MBMS service can be assured more reliably.

This application is the National Phase of PCT/JP2009/000807, filed Feb. 24, 2009, which claims priority based on the Japanese patent application No. 2008-052469 filed on Mar. 3, 2008, the content of which is incorporated hereinto by reference in its entirety.

The invention claimed is:

1. A base transceiver station that transmits same data to a plurality of mobile stations using a common channel, comprising:
    a maximum transmit power detector that detects a maximum transmit power value at each spreading factor during transmission of the data, from a transmit power of said data transmitted to said plurality of mobile stations in cells controlled by the base transceiver station; and
    a transmit power determination unit that determines a transmit power at each spreading factor based on the relation between said maximum transmit power values detected and said spreading factors.

2. The base transceiver station according to claim 1, wherein said transmit power determination unit determines a transmit power at each of said spreading factors by a maximum transmit power whose rate to said spreading factor is the highest, from said maximum transmit power values detected.

3. The base transceiver station according to claim 1, wherein the transmit power determination unit determines a transmit power by adding an offset to said corresponding maximum transmit power value, for said spreading factor.

4. The base transceiver station according to claim 1, wherein said maximum transmit power detector detects said maximum transmit power values at predetermined intervals, calculates an average value of the maximum transmit power values, and detects a maximum transmit power value by using an average value of the maximum transmit power values calculated at each of said spreading factors.

5. A method of determining transmit power in a base transceiver station that transmits same data to a plurality of mobile stations using a common channel, comprising:
   detecting a maximum transmit power value at each spreading factor during transmission of the data, from a transmit power of said data transmitted to said plurality of mobile stations in cells controlled by the base transceiver station; and
   determining a transmit power at each spreading factor based on the relation between said maximum transmit power values detected and said spreading factors.

6. The method of determining transmit power according to claim 5, wherein in said determining a transmit power, a transmit power at each of said spreading factors is determined by a maximum transmit power whose rate to said spreading factor is the highest, from said maximum transmit power values detected.

7. The method of determining transmit power according to claim 5, wherein in said determining a transmit power, a transmit power is determined by adding an offset to said corresponding maximum transmit power value, for said spreading factor.

8. The method of determining transmit power according to claim 5, wherein in said detecting maximum transmit power, said maximum transmit power values are detected at predetermined intervals, an average value of the maximum transmit power values is calculated, and a maximum transmit power value is detected by using the average value of the maximum transmit power values calculated at each of said spreading factors.

* * * * *